United States Patent Office 3,741,838
Patented June 26, 1973

3,741,838
MANDREL FOR USE IN AND A METHOD OF PRODUCING CONTAINERS AND A MACHINE FOR EMPLOYING THE METHOD
Birte Christensen and Borge Christensen, both of Tunemarken pr. 2690 Karlslunde, Denmark, and Helge Hovad and Karl Erik Hovad, both of Kvikmarken 22, 2860 Soborg, Denmark
Filed Mar. 18, 1969, Ser. No. 808,081
Claims priority, application Denmark, Mar. 18, 1968, 1,134/68
Int. Cl. B65h 81/00
U.S. Cl. 156—173           3 Claims

ABSTRACT OF THE DISCLOSURE

A mandrel for use in the production of containers wherein a filament or strip shaped material is wound on to the mandrel, the mandrel consisting of a bladder core wholly or partially enclosed within a flexible jacket and having stiffening members inserted between the bladder core and the jacket. Said members are detachably or pivotally connected to a coupling member for mounting the mandrel on a shaft. Also a method of performing the winding process is described as well as machines for carrying out the method.

---

Figure 1:
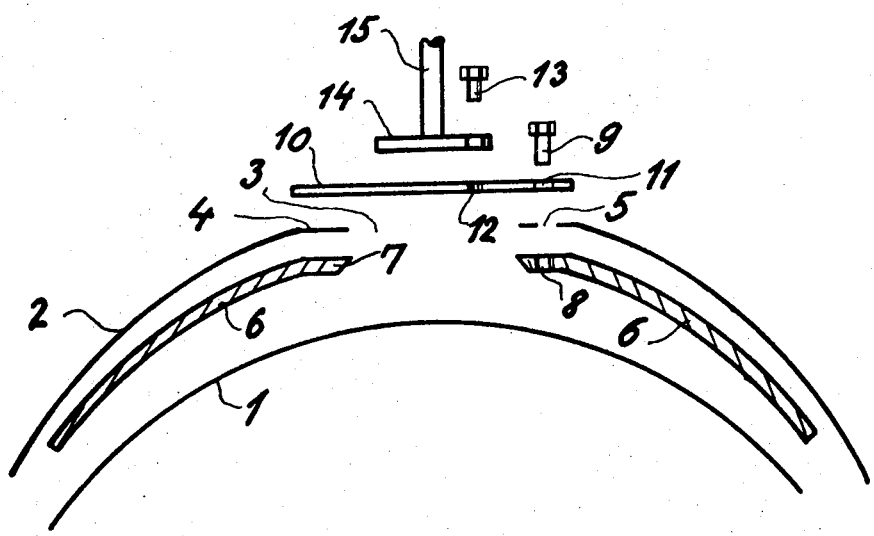

Larger containers for liquids and gases, for instance oil tanks, are normally constructed by welding steel plates together. But such steel tanks suffer from a very serious drawback, in that their resistance to corrosive substances is very low, and this drawback is particularly great where the tanks are to be dug into the ground. It has therefore in later years become common practice to make oil tanks and similar containers from glass fibre reinforced polyester by hand mounting, pressing or winding on to a mandrel. The latter method gives the greatest material strength. The conventional cylinder tanks are generally constructed by winding the cylindrical portion on to a rotating mandrel, while the arcuate end members are pressed in a mold and glued to the cylindrical portion. The glue seams, however, form rather weak points that greatly reduce the capacity of the tank to resist high pressures within the tank. It has therefore been suggested to construct cylindrical tanks by a single, continuous winding process, leaving but relatively small openings in the center of the arcuate end members. This process, however, requires the use of a mandrel which can be removed afterwards through the small openings. It has been tried for instance to use mandrels of meltable salt mixtures, eutectic metal alloys and gipsum. Where the containers are large such mandrels will be very heavy and costly and besides require the use of sturdy winding machinery with complex winding mechanisms. Attempts to overcome also these drawbacks have led to the idea of using an inflatable bladder core as the winding mandrel, but in the practical employment of this technique it has proved to be difficult to give the bladder core the rigidity required for being suspended and guided during the winding process without the risk of deflections or other forms of deformation. The bladder core must for instance be so resistant to torsion that it will not yield to the tangential forces to which it is subjected by the tension in the glass filaments.

The present invention relates to a mandrel for use in the construction of containers by windings of filament or strip material on to a mandrel with an inflatable bladder core, and it is the object of the invention to provide a mandrel possessing the required rigidity and capacity of transmitting a torque between the various parts of the mandrel and a shaft on which it is mounted during winding to enable it to be employed for the production of even very large tanks.

This object has been accomplished by providing the mandrel with a jacket of flexible material enclosing at least part of the bladder core and with a plurality of rigid members disposed between the jacket and the bladder core and secured detachably or pivotally to a coupling member adapted to be mounted on a shaft. The said rigid members in this structure serve partly to stiffen a greater or smaller portion of the mandrel, partly to distribute the forces acting between the mandrel and the shaft over a corresponding area of the mandrel surface without causing difficulty for the extraction of the mandrel from the finished container.

If the mandrel is convex, at least in the region surrounding the coupling member, the rigid members may expediently be formed as sergments of a dome corresponding to the convex shape of the mandrel so that a large contact face between the rigid members and the bladder core is provided.

In a particularly simple embodiment of the mandrel the coupling member has the form of a preferably circular disc and the rigid members at the end facing the disc are provided with plane attachment flanges adapted to be bolted to the disc. Thus the rigid members may be formed as an integral dome so that the outer face of the mandrel becomes entirely smooth. The jacket may, if desired, be secured between the plane flanges and the disc, though this is not necessary, and it may sometimes be more convenient to provide the jacket with a neck portion extending above and collected over the upper face of the disc to prevent the penetration of fluid polyester. It is also possible to provide such a neck portion with an internal collar which can be secured between the disc and the flanges.

The desired rigidity and strength of the mandrel can best be obtained when the jacket encloses practically the entire bladder core. But for many purposes a fully adequate strength can be obtained by shaping the jacket substantially as a dome secured along its edge to the bladder core.

The mandrel according to the invention may in practice be given many different geometrical shapes; it may for instance be spherical or cylindrical with arcuate end sections, ellipsoidal or superellipsoidal. Due to its low weight the mandrel is particularly suitable for one-sided suspension, and this in turn makes it possible to mount the most expedient winding by means of a simple winding mechanism, since the position of the mandrel relatively to the mechanism may be varied without difficulty in the course of the winding process to suit requirements.

The invention also relates to a method for use in the production of a container of fibre-reinforced material by winding wetted filament or strip material on to a mandrel which is rotatable about an axis extending through its center, said axis of rotation being pivotable during winding over an angle of from 60° to 90° about a second axis likewise extending through the center of the mandrel and disposed at right angles to the axis of rotation, and the object is to provide a method that makes it possible to produce in a single, continuous working cycle a large container, for instance an oil tank, having no other openings than the one defined by the coupling member of the mandrel. This opening may be closed by a glued-on cover provided with fittings for the necessary pipe connections.

This object has been accomplished by carrying out the winding by means of a filament or strip guide rotating in a path around the mandrel, the guide and the mandrel being relatively displaceable in the axial direction of the path of movement of the guide during part of the winding process. In this way it will be possible to carry out the first part of the winding in small circles touching the coupling member and then to proceed to winding in great circles, which, due to the movements of the mandrel, will gradually cover up the entire surface of the mandrel with the exception of the coupling member. The use of a rotating filament or strip guide means partly a simplification of the movements of the mandrel, and partly a reduction of the tangentialy directed forces to which the mandrel is subjected by the filament or strip tension during the winding process.

The necessary relative displacement of the mandrel and the filament or strip guide in the axial direction of its path of movement may be achieved by moving the guide in the said axial direction; but a simpler construction is obtained when the said relative displacement of the mandrel and and the filament or strip guide is performed by swinging the axis of rotation in a relatively small angle about a second axis parallel to the pivotal axis through the mandrel center before the pivotal movement about that latter axis is commenced. By guiding the pivotal movement of the axis of rotation so that the second pivotal axis during the first stages of the winding process gradually approaches the pivotal axis through the mandrel center, it has been achieved that the small circles in which the winding is initially carried out will increase gradually and then at a certain moment change into large circles.

By guiding the pivotal movement of the axis of rotation relatively to the movement of the filament or strip guide so that the curve representing the axis angle as a function of the number of revolutions of the guide will be substantially S-shaped, a substantially uniform wall thickness of the container will be ensured.

The invention, moreover, comprises a machine for carrying out the defined method, i.e. a machine having a shaft to which the mandrel can be secured and which is mounted to be rotatable about its axis and pivotable over an arc of between 60 and 90° about a pivotal axis perpendicular to the axis of rotation and extending through the center of a mandrel mounted on the shaft. This machine is characterized in that it is provided with a rotatable basket containing a filament or strip store and supporting a filament or strip guide which during the rotation of the basket travels over a path enclosing the mandrel, the shaft being further guided so that the mandrel is displaced by a relatively small distance relatively to the guide in the axial direction of the path of movement of the guide.

By mounting the shaft in a support member that can move along a curved track disposed in a vertical plane and provided with an arcuate section extending over from 60° to 90° and the center of which is in the center of the mandrel, while a lower end section forms an extension of the first section and has a smaller radius of curvature than the former, it has been achieved that both the pivotal movement of the shaft and its displacement relatively to the filament or strip guide in the axial direction of the path of movement of the guide can be performed by the same means.

In a simpler embodiment of the driving mechanism the shaft is mounted on one end of a bipartite curved or angular arm, the other end of which is mounted to be pivotable about a horizontal axis through the center of the mandrel, the two sections of the arm being joined together by a hinge, the axis of which is parallel to the pivotal axis of the arm, and the relative rotation of the two sections of the arm being limited to a relatively small angle.

Figure 2:
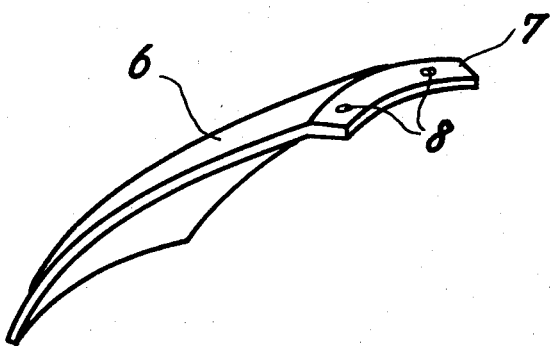
Figure 3:
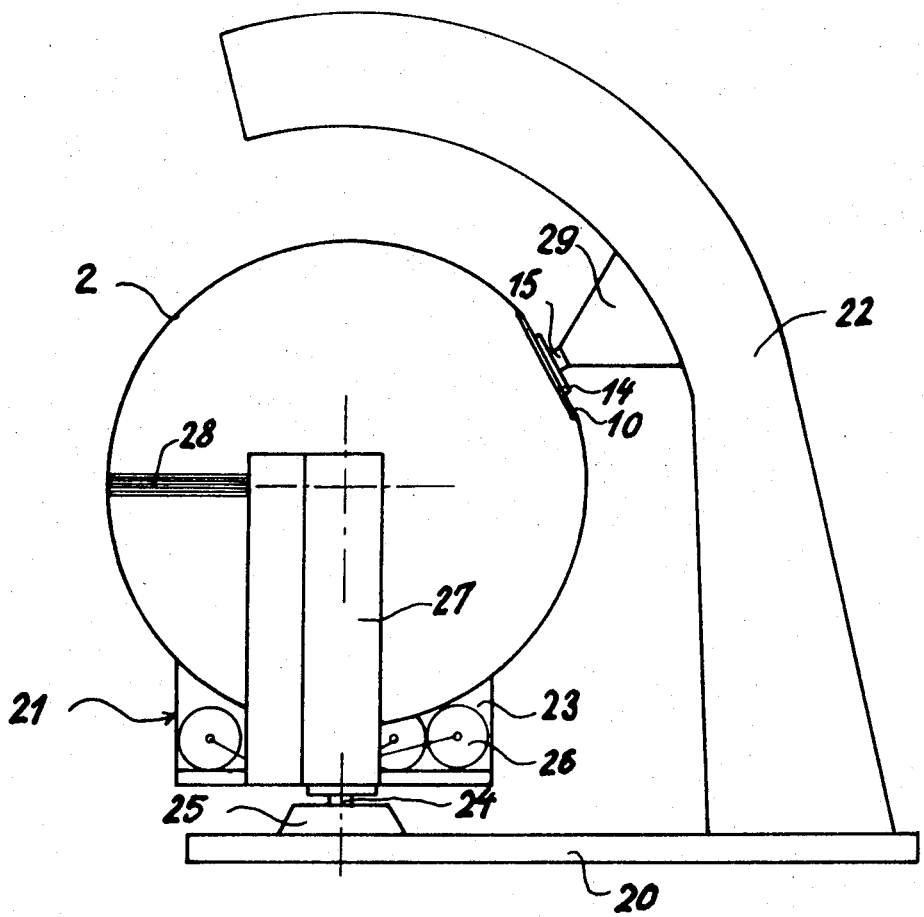
Figure 4:
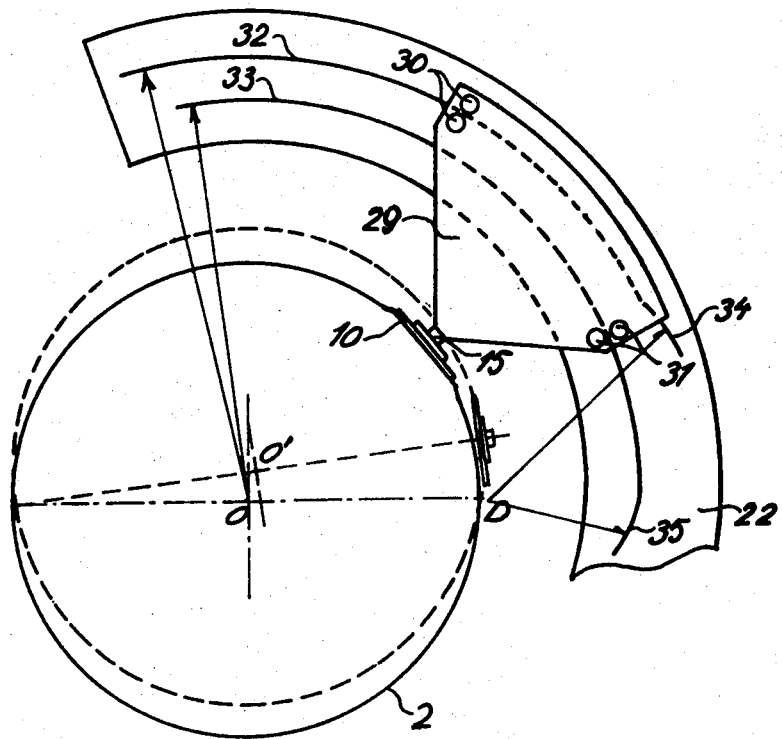
Figure 5:
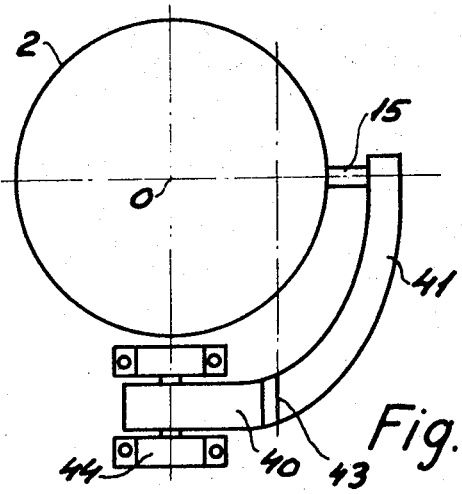
Figure 6:
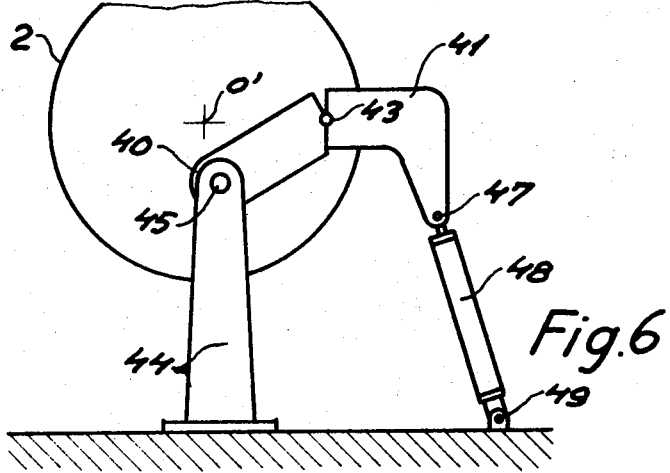
Figure 7:
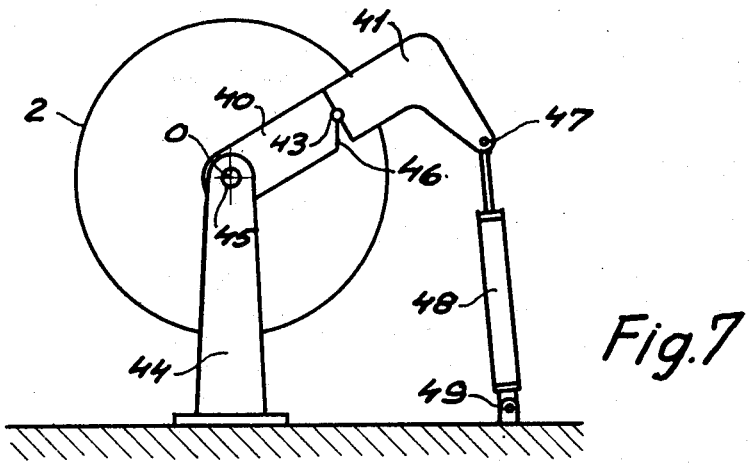

The invention will be explained here in detail and with reference to the drawing, in which FIG. 1 presents an axial section through the upper portion of an embodiment of the mandrel according to the invention with the individual members drawn slightly apart, FIG. 2 presents a perspective view of one of the rigid members, FIG. 3 is a schematic vertical view of the mandrel disposed in an embodiment of the winding machine according to the invention, FIG. 4 is a second, schematic vertical view of the means guiding the movement of the mandrel during the winding process, FIG. 5 is a horizontal view presenting schematically a modified embodiment of the suspension means for the supporting shaft of the mandrel, and FIGS. 6 and 7 are vertical views presenting, also schematically, the same suspension means in two different working positions.

The mandrel illustrated in FIG. 1 has an inflatable core 1 of a resilient material, for instance rubber, serving to distend an outer jacket 2 of a flexible but non-stretchable material of high ultimate tensile strength. In the embodiment shown here the distended mandrel is spherical. The jacket 2 has a circular opening 3, and in the edge portion 4 of the jacket surrounding this opening are formed a plurality of screw holes 5. Between the core 1 and the jacket 2 there are a plurality of segments 6, one of which is shown in greater detail in FIG. 2, and which together form approximately a domed cap. These segments are rigid and may for instance be made of metal or plastic. Each segment 6 has a plane flange 7 with threaded holes 8 for receiving screws 9 by means of which the segments can be secured to a circular coupling disc 10 disposed outwardly of the jacket 2 and provided with holes 11 for the screws 9. These screws extend also through the holes 5 in the jacket 2, whereby the edge portion 4 thereof is secured between the segments 6 and the coupling disc 10. This disc is further provided with a plurality of threaded holes 12 for receiving screws 13 by means of which the disc can be secured to a flange 14 on a supporting and driving shaft 15 of a winding machine.

A suitable winding machine for the production of spherical tanks is illustrated schematically in FIG. 3. It comprises a base member 20, on which is disposed a filament store 21 and a mandrel support frame 22. The filament store 21 comprises a basket 23 mounted on a vertical shaft 24 which is rotatably mounted in a support member 25 on the base 20. The basket contains a plurality of glass fibre reels 26 from which the filaments during the operation of the machine are drawn through a polyester bath, not shown here, and through a vertical filament guide 27 secured on a radial arm extending from the basket. When the filament store rotates about its vertical axis, polyester-wetted filaments are issued from the upper end of the filament guide in the form of a strip 28, the width of which may be varied in any known manner not shown here.

In the mandrel support frame is mounted a mandrel support 29, in which the shaft 15 is rotatably journaled and so disposed and controlled that during the winding process it can be moved over a curved path which is substantially concentric with the spherical mandrel. This control may be effected for instance as indicated in FIG. 4, where the mandrel support 29 is provided with two pairs of rollers 30 and 31 cooperating respectively with their associated rails 32 and 33. These rails form quarter circles with the center in the center O of the spherical mandrel, and when the rollers move along these lengths of the rails the mandrel performs an angular movement about its center. But the rails have at their lower ends extensions 34 and 35 which curve less and more, respectively, than the quarter circles. In the embodiment illustrated here the rail portions 34 and 35 are shaped so that the mandrel support 29 in its lowermost position has lifted the sphere a distance to the position indicated by the dotted line, so that its center is now in the point $O^1$ and so that the sphere during the upward movement of the mandrel support from this position performs first a pivotal movement about a point D disposed in or adjacent to the lower edge of the coupling disc 10. The fulcrum of this pivotal movement moves during the continued movement of the mandrel support along the rail members 34 and 35 until it is disposed in the sphere center O.

The machine, moreover, is provided with a driving mechanism, not shown here, rotating the filament store 21 at a relatively high rate, at the same time rotating the shaft 15 and thereby the spherical mandrel slowly. Moreover, there is a driving mechanism, not shown either, for moving the mandrel support 29 along the rails 32, 34, and 33, 35 in accordance with a predetermined pattern.

The winding of the mandrel is initiated when the mandrel support is in its lowermost position, when the mandrel will be in the position indicated by the dotted line in FIG. 4. In this position the filaments are positioned in small circles touching the coupling disc 10. As the mandrel support moves along the rails 34 and 35, the small circles along which the winding proceeds increase gradually, and when the mandrel support has reached the quarter-circular rail sections and the mandrel center has moved from $O^1$ to O, the filaments are positioned in great circles. The remainder of the winding process will thus follow great circles rotating relatively to the mandrel during the continued upward movement of the mandrel support along the rails 32 and 33, and when at least the shaft 15 is vertical the winding is completed with windings the plane of whic his perpendicular to the shaft.

The tank produced in this manner is cured on the mandrel while rotated slowly to prevent percolation of polyester. After curing the mandrel is withdrawn by expelling the air out of the bladder core and releasing the segments from the coupling disc 10 by removing the screws 9. The entire mandrel may now be extracted through the opening in the tank defined by the coupling disc 10. The tank is finished by applying an inner and outer gel coating and gluing on a cover with fittings in the opening and a final curing in a heating chamber.

The winding process described above makes is possible to vary the material thickness as required by varying the pattern of the mandrel support movements. As compared with winding methods based on the application of a stationary filament store and a relatively rapidly rotating mandrel, the present process has the advantage that polyester throw-off is avoided, and more over the mechanical construction of the winding mechanism is much simpler.

Another embodiment of the winding machine is illustrated in FIGS. 5-7. In this construction the mandrel support shaft 15 is journaled in the free end of a curved arm comprising two links 40 and 41 joined together by a hinge 43, the inner link 40 being mounted pivotally in a bearing block 44 by means of a shaft 45, the axis of which is horizontal and disposed in substantially the same vertical plane as the center O of the mandrel 2. The axis of the hinge 43 is parallel to the shaft 45.

The relative rotating movement of the two arm links is limited to a comparatively small angle in that their end faces abut. The end face of the link 41 facing the link 40 is perpendicular to the upper face of that link, and the portion of the adjoining end face of the link 40 located above the hinge 43 is also perpendicular to the upper face of that link, whereas the portion 46 of this end face located below the hinge extends angularly rearwardly from the hinge.

The outer link 41 is connected rotatably at 47 with the piston rod of a hydraulic cylinder 48 which at 49 is connected rotatably with a stationary member. A stop member not shown here prevents the inner link 40 from rotating further clockwise than indicated in FIG. 6.

The winding is commenced when the members are in the positions shown in FIG. 6, the outer link 41 being horizontal and the center $O^1$ of the mandrel being spaced above the shaft 45, so that the first windings are positioned in small circles touching thhe coupling member of the mandrel. Simultaneously with the starting of the rotation of the filament store, which for the sake of clarity is left out here but which may be adapted and disposed as illustrated in FIG. 3, the hydraulic cylinder 48 is actuated and begins to project its piston slowly. During the first part of this movement the link 41 is turned about the hinge 43 until the portion of its end face disposed above the hinge abuts the corresponding end face of the link 40, at which moment the mandrel center has been lowered exactly so much that it is now disposed on the axis of the shaft 45. By the continued projection of the piston of the cylinder the whole arm 40, 41 is rotated as a rigid unit about the shaft 45 and the mandrel center O, whereby the winding during the remaining part of the winding process are positioned in great circles.

Both the winding machine and the mandrel may be formed in other ways than illustrated in the drawing and as described above. For instance may the segments 6 be formed as narrow fingers hinged instead of bolted to the coupling disc 10. The jacket 2 need not be provided with the screw holes 5, which in many cases may cause an undesirable weakening at this point. As previously mentioned, it may have a neck portion extending above the disc 10. Moreover, the jacket 2 need not enclose the entire of the bladder core, but may have the shape of a dome the edge of which is secured to the bladder core immediately below the lower ends of the segments 6. There are many other possibilities of modifying the structural details, for instance to other geometrical shapes than the spherical, possibly in connection with a two-side suspension and using two diametrically opposed coupling means with the members pertaining thereto. The size of the containers produced by using the mandrel according to the invention may be varied within very wide limits. The containers may also be made from a flexible material, for instance reinformed neoprene, so that they take on the character of bags.

What is claimed is:

1. A method in the construction of a container of fibre reinforced material comprising winding wetted filaments on to a mandrel, the mandrel being rotated about an axis extending through its center, said axis of rotation being pivoted during winding about a second axis likewise extending through the center of the mandrel and disposed at right angles to the axis of rotation, the winding being effected by rotating the source of the filament in a path around the mandrel, and covering the entire end of the mandrel by displacing said path of the filament source and the mandrel during part of the winding process relative to one another in the axial direction of the path of movement of the source of the filament.

2. A method according to claim 1 wherein in said relative displacement of the mandrel and the filament is effected by swinging the axis of rotation in a relatively small angle about a second axis parallel to the axis through the mandrel center before the pivotal movement about the latter axis is commenced.

3. A method according to claim 2 wherein the pivotal movement of the axis of rotation is guided so that the second pivotal axis during the first part of the winding process gradually approaches the pivotal axis extending through the mandrel center.

(References on following page)

References Cited

UNITED STATES PATENTS

| | | | |
|---|---|---|---|
| 2,788,836 | 4/1957 | Trevaskis et al. | 156—170 |
| 2,901,190 | 8/1959 | Wentz | 242—2 |
| 3,137,898 | 6/1964 | Geringer | 18—45 |
| 3,140,058 | 7/1964 | Courtney | 242—2 |
| 3,257,690 | 6/1966 | Scott | 18—45 |
| 3,386,872 | 6/1968 | Medney | 156—173 |
| 3,408,241 | 10/1968 | Keyt et al. | 156—173 |
| 3,031,099 | 4/1962 | Wiltshire | 156—175 X |
| 3,112,234 | 11/1963 | Krupp | 156—175 X |
| 3,414,449 | 12/1968 | Beach | 156—173 |
| 3,449,182 | 6/1969 | Wiltshire | 156—172 |

CARL D. QUARFORTH, Primary Examiner

E. E. LEHMANN, Assistant Examiner

U.S. Cl. X.R.

156—175; 242—2